(12) United States Patent
Brown et al.

(10) Patent No.: US 7,431,333 B2
(45) Date of Patent: Oct. 7, 2008

(54) OCCUPANT SAFETY-RESTRAINT SYSTEM AND METHOD FOR FULLY DEPLOYING AN AIRBAG PRIOR TO OCCUPANT CONTACT

(75) Inventors: Joseph R Brown, Grosse Ile, MI (US); Joseph F Mazur, Washington, MI (US); Marshall L. Quade, Pickney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 10/711,920

(22) Filed: Oct. 13, 2004

(65) Prior Publication Data

US 2006/0076761 A1    Apr. 13, 2006

(51) Int. Cl.
*B60R 21/16* (2006.01)
*B60R 22/00* (2006.01)

(52) U.S. Cl. ............................ 280/735; 280/801.1

(58) Field of Classification Search ............ 280/735, 280/801.1
See application file for complete search history.

(56) References Cited

U.S. PATENT DOCUMENTS

| | | |
|---|---|---|
| 5,074,583 A | 12/1991 | Fujita et al. |
| 6,161,439 A | 12/2000 | Stanley |
| 6,199,903 B1 | 3/2001 | Brambilla et al. |
| 6,259,042 B1 | 7/2001 | David |
| 6,260,879 B1 | 7/2001 | Stanley |
| 6,364,352 B1 | 4/2002 | Norton |
| 6,454,304 B1 | 9/2002 | Steffens, Jr. |
| 6,512,969 B1 | 1/2003 | Wang |
| 6,516,239 B1 | 2/2003 | Madden et al. |
| 2002/0056975 A1 | 5/2002 | Yoon et al. |
| 2003/0066362 A1 | 4/2003 | Lee et al. |

*Primary Examiner*—Kevin Hurley
*Assistant Examiner*—Joselynn Y. Sliteris
(74) *Attorney, Agent, or Firm*—Dickinson Wright PLLC; Frank MacKenzie; Ray Coppiellie

(57) ABSTRACT

An occupant safety restraint system ("OSR system") (10) and method for fully deploying an airbag (20) before an occupant contacts the airbag (20). In one embodiment, the OSR system (10) includes a seatbelt restraint system (12), a variable-output airbag system (14), and a controller 18 coupled to the seatbelt restraint system (12) and the airbag system (14). The seatbelt restraint system (12) includes a seatbelt restraint (24) for restraining the occupant and a seatbelt-tension sensor (28) for detecting a load or tension in the seatbelt restraint (24). The controller 18 utilizes the seatbelt load for determining a current seatbelt-tension rate and actuating the airbag system (14) to deploy the airbag (20) at one or more output rates. In other words, the controller 18 can utilize the seatbelt restraint system (12) and the airbag system (14) in combination for regulating the output rate of the airbag system (14).

10 Claims, 2 Drawing Sheets

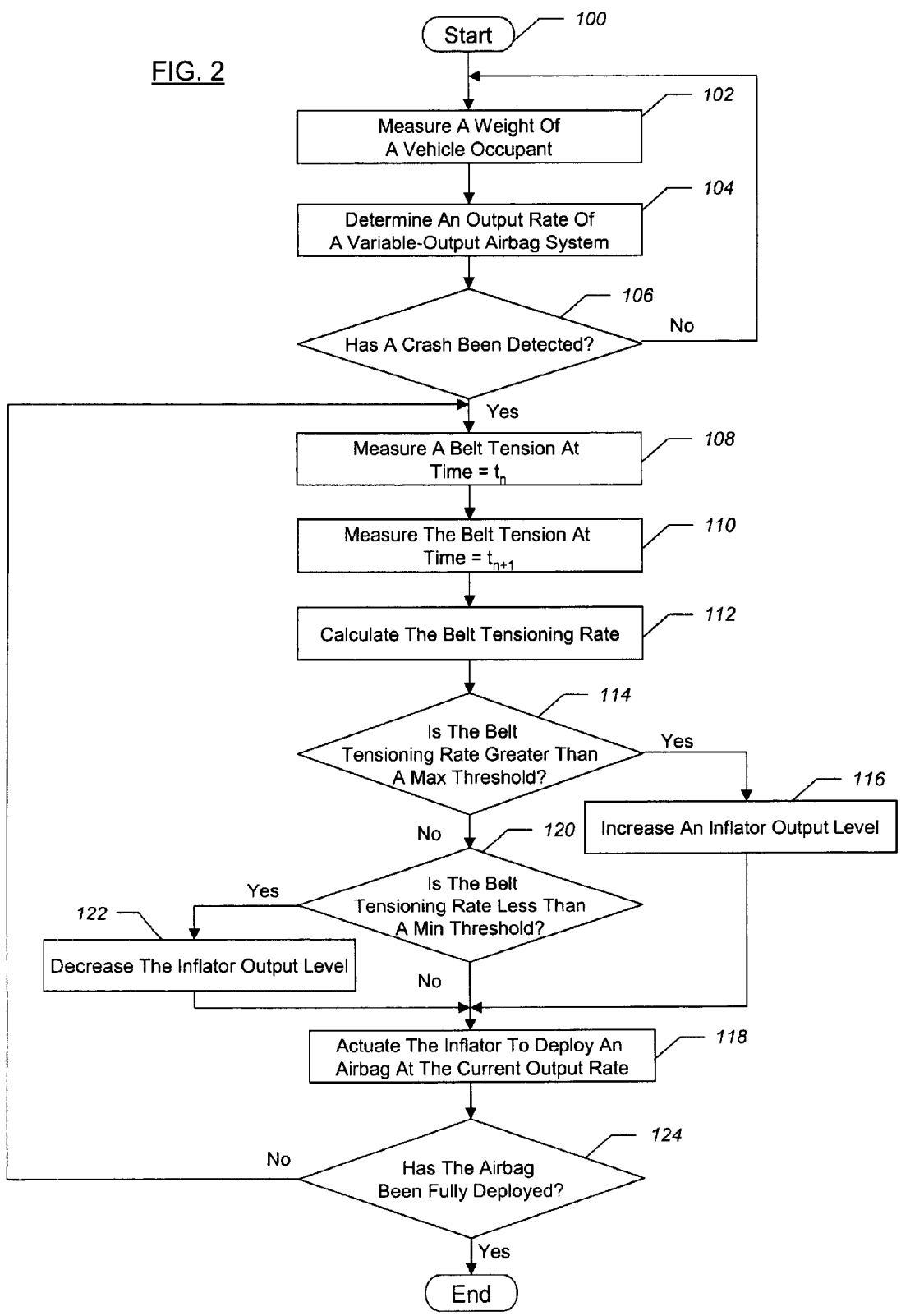

OCCUPANT SAFETY-RESTRAINT SYSTEM AND METHOD FOR FULLY DEPLOYING AN AIRBAG PRIOR TO OCCUPANT CONTACT

TECHNICAL FIELD

The present invention relates generally to occupant safety-restraint systems for vehicles, and more particularly to an occupant safety-restraint system for allowing an occupant to contact a fully deployed airbag after the occupant has imparted a maximum load on his seatbelt restraint.

BACKGROUND

Automotive manufacturers are well known for incorporating various types of airbag systems into their vehicles. These airbag systems typically include one or more crash sensors, which are utilized for detecting a crash event and actuating the deployment of one or more airbags. As is known, these airbags ordinarily are utilized for cushioning an occupant in a crash event and gradually stopping that occupant's momentum over a relatively long period of time. Specifically, the occupant can press into a deployed airbag, compress the gas within the airbag, and force the gas out of the airbag.

Moreover, automotive manufacturers are also known for incorporating seatbelt restraints into their vehicles. Each seatbelt restraint typically includes a lap belt portion and a shoulder belt portion. Both the lap belt portion and the shoulder belt portion are intended to restrict forward movement of the occupant during a crash event.

It would be desirable to provide an occupant restraint system that utilizes a variable-output airbag system and a seatbelt restraint system in combination for allowing an occupant to contact a fully deployed airbag after the occupant has imparted a maximum load on his seatbelt restraint.

SUMMARY OF THE INVENTION

The present invention provides an occupant safety restraint system ("OSR system") and method for fully deploying an airbag before an occupant contacts the airbag. In one embodiment, the OSR system includes a seatbelt restraint system, a variable-output airbag system, and a controller coupled to the seatbelt restraint system and the airbag system. The seatbelt restraint system includes a seatbelt restraint for restricting the occupant and a seatbelt-tension sensor for detecting a load or tension in the seatbelt restraint. The controller utilizes the seatbelt load for determining a current seatbelt-tension rate and actuating the airbag system to deploy the airbag at one or more output rates. In other words, the controller can utilize the seatbelt restraint system and the airbag system in combination for regulating the output rate of the airbag system. In that way, the OSR can allow the occupant to contact and press into the airbag substantially proximate to when the occupant has imparted a maximum load on his seatbelt restraint.

One advantage of the present invention is that an OSR system is provided that utilizes a variable output airbag system and a seatbelt restraint system in combination for substantially decreasing the risk of injury to an occupant.

Another advantage of the present invention is that an OSR system is provided that allows a fully deployed airbag to cushion an occupant when the occupant imparts a maximum load on the seatbelt restraint.

Yet another advantage of the present invention is that an OSR system with a variable-output airbag system is provided that can continuously regulate and/or correct the output rate of the airbag system based upon measurements of specific parameters taken during the crash event.

Still another advantage of the present invention is that an OSR system is provided that can safely deploy an airbag for an out-of-position occupant.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 2 is a logic flow diagram of a method for operating the occupant restraint system shown in FIG. 1, according to one advantageous embodiment of the claimed invention.

DETAILED DESCRIPTION OF THE INVENTION

Figure 1:
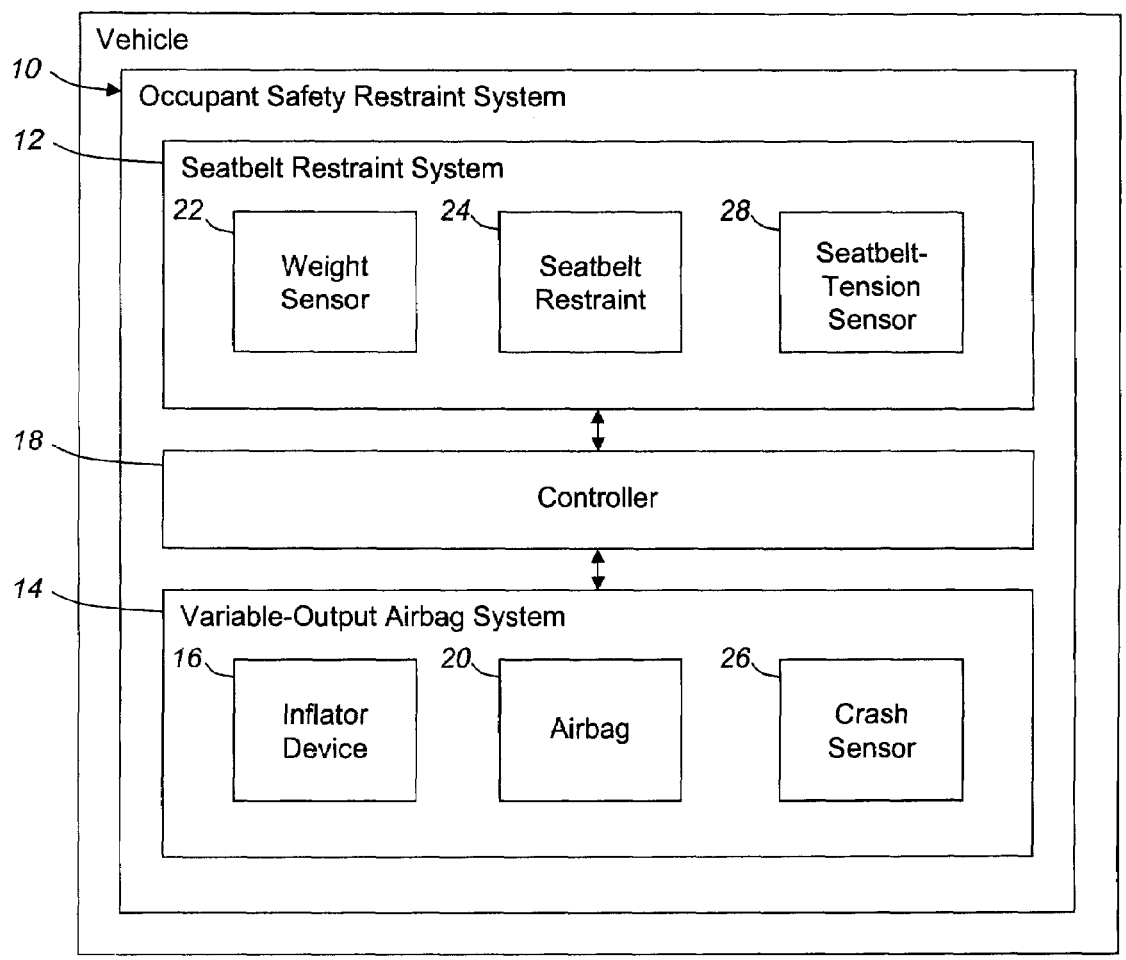
FIG. 1 is a schematic diagram of an occupant restraint system, according to one advantageous embodiment of the claimed invention.

In the following figures, the same reference numerals are used to identify the same components in the various views.

The present invention is particularly suited for utilizing a three-point seatbelt restraint and a variable-output airbag system in combination for regulating the output rate of a front airbag. However, various other suitable seatbelt restraints and airbags can be utilized as desired. In this regard, it will be understood that the embodiments described herein employ features where the context permits. Various other embodiments without the described features are contemplated. For that reason, it will be appreciated that the invention can be carried out in various other modes and utilized for other suitable applications as desired.

Referring to FIG. 1, there is shown a schematic diagram of an occupant safety restraint system 10 ("OSR system") integrated within a vehicle, according to one advantageous embodiment of the claimed invention. The OSR system 10 generally includes a seatbelt restraint system 12 ("seatbelt system"), a variable-output airbag system 14 ("airbag system"), and a controller 18 coupled to the seatbelt system 12 and the airbag system 14.

The airbag system 14 includes an airbag 20 and a variable inflator device 16 for deploying the airbag 20 at two or more output rates. In addition, in this embodiment, seatbelt restraint system 12 also includes one or more weight sensors 22 coupled to a vehicle seat. Each weight sensor 22 is utilized for detecting the weight of an occupant in the vehicle seat. The weight sensor sends a weight measurement signal to the controller 18, which utilizes this data for determining an output rate for the variable-output airbag system 14. The controller 18 utilizes the occupant's weight to search an archived timetable for an estimated amount of time elapsing before the occupant applies a maximum load on his seatbelt restraint.

A person of ordinary skill in the art will understand that the output rates of the airbag system can be predetermined selections based on tests conducted during a specific G-level crash for a specific occupant weight. The test results can be utilized to produce an archived time table, which is stored in the controller's database. The following table provides exemplary test results, which indicate an appropriate output rate for the airbag system 14 during a specific G-level crash.

| Occupant Weight (lbs) | Time For Max Belt Load |
| --- | --- |
| W < 100 | 45 ms at 300 lbs |
| 100 < W < 150 | 35 ms at 350 lbs |
| 150 < W < 220 | 30 ms at 400 lbs |
| W > 220 | 25 ms at 450 lbs |

For example, the weight sensor 22 can detect that the occupant weighs 160 lbs and send this data to the controller 18. Thereafter, the controller 18 can utilize this data and refer to the archived time table for determining that a typical occupant, who weighs between 150 and 200 lbs, may apply a maximum load on the seatbelt restraint 24 30 ms after impact. Thereafter, the controller 18 can calculate a corresponding output rate for actuating the airbag system 14 to fully deploy the airbag 20 within about 30 ms.

Specifically, the controller 18 can utilize the relevant time in the archived table and the volume of the airbag for determining the output rate required to deploy the airbag within that time.

As exemplified in the chart hereinabove, the controller 18 selects a substantially high output rate when the occupant weighs a substantial amount e.g. 95th percentile individuals. In addition, the controller 18 selects a substantially low output rate when the occupant weighs a relatively low amount, e.g. 5th percentile individuals. In this way, the OSR system 10 allows the occupant to contact a fully deployed airbag 20 substantially proximate to when the occupant imparts a maximum load on his seatbelt restraint 24. This feature is beneficial because the OSR system can distribute the occupant's load between the seatbelt restraint and the airbag substantially proximate to when the occupant is subjected to a load during the crash. For that reason, the OSR system can utilize the airbag system and the seatbelt system in combination for substantially decreasing the occupant's risk of injury.

In another embodiment, the archived time table can be organized and based on the velocity of the vehicle at time $t_0$, which is the point of impact during the crash event. In this regard, the OSR system can include a velocity sensor for detecting the vehicle's velocity and transmitting the measurement to the controller. It will be appreciated that tests conducted on the OSR systems can provide suitable output rates based on the velocity of the vehicle. An example of these test results are shown in the following table.

| Vehicle Velocity (mph) | Time For Max Belt Load |
| --- | --- |
| 14 < V < 18 | 35 ms |
| 18 < V < 30 | 30 ms |
| V > 30 | 25 ms |

It is further understood that the archived time table can be organized and based on various other suitable parameters besides occupant weight and vehicle velocity.

The airbag system 14 further includes one or more crash sensors 26 for detecting a crash event and sending a crash signal to the controller 18. These crash sensors 26 are accelerometers or other suitable sensor devices as desired.

The controller 18 is coupled to the inflator device 18 for actuating the inflator device 16 to deploy the airbag 20 when the controller 18 receives the crash signal from the crash sensor 26. Specifically, the controller 18 can actuate the airbag system 14 with the output rate, which is calculated according to the method generally described above.

The seatbelt system 12 includes the seatbelt restraint 24 and a seatbelt-tension sensor 28 coupled to the seatbelt restraint 24. The seatbelt-tension sensor 28 is utilized for detecting a load in the seatbelt restraint 24 during the crash event. This sensor 28 is coupled to the controller 18 for sending the load measurements to the controller 18.

The controller 18 utilizes these load measurements for adjusting the output rate of the airbag system 14 such that the airbag is fully deployed when the occupant has imparted a maximum load on the seatbelt restraint 24 (as detailed in the description for the FIG. 2). In this way, the controller 18 can regulate and/or provide real-time correction of the output rate for fully deploying the airbag at a time proximate to when a substantially high load can be distributed between multiple restraint devices. This feature is beneficial because it adjusts the output rate according to circumstances that may not have been accounted for in the original crash tests, which were conducted by the manufacturer for producing the archived time table. In continuation of the previous example, a 160-lb. occupant may apply a maximum load on the seatbelt 35 ms after impact instead of 30 ms after impact because the occupant is substantially reclined or otherwise out-of-position. In that regard and as detailed in FIG. 2, the OSR system 10 can correct the output rate to fully deploy the airbag later than originally expected.

Referring now to FIG. 2, there is shown a logic flow diagram of a method for operating the OSR system 10 shown in FIG. 1, according to one advantageous embodiment of the claimed invention. In this embodiment, the OSR system 10 utilizes various archived reference tables for regulating the output rate of the airbag system 14. These reference tables are stored within the controller's database and are compilations of data obtained from tests conducted on vehicles having the OSR system 10. This data is organized and based on the weight of the, occupant in the vehicle. However, it is contemplated that the reference data can be based on various other kinds of suitable data.

This method commences in step 100 and then immediately proceeds to step 102.

In step 102, one or more weight sensors 22 measure the weight of the occupant in the vehicle seat and transmit the weight measurement signal to the controller 18. This step may be accomplished by utilizing bladders or various other suitable weight sensing mechanisms known in the art. The sequence then proceeds to step 104.

In step 104, the controller 18 utilizes the occupant's weight measurement for determining the output rate of the airbag system 14. As introduced hereinabove, the controller 18 utilizes the occupant's weight measurement to search the archived time table for the estimated amount of time elapsing before the occupant imparts a maximum force on the seatbelt restraint 24. The controller 18 then utilizes the estimated time and the volume of the airbag to calculate an output rate, which allows the airbag system 14 to fully deploy the airbag 20 within the estimated time. For example, the weight sensor 22 may detect that the occupant weighs 160 lbs. The controller 18 can then refer to the archived time table and determine that maximum seatbelt loading can occur 30 milliseconds after the crash event. The controller 18 can utilize the 30 millisecond time period and the known volume of the airbag, e.g. 60 liters, for determining an sufficient output rate for fully deploying the airbag substantially proximate to 30 milliseconds after impact. In this example, the controller 18 can calculate the output rate as two liters per millisecond to fully inflate the 60-liter airbag within 30 milliseconds. Then, the sequence proceeds to step 106.

In another embodiment, steps 102 and 104 are respectively accomplished by detecting the vehicle's velocity and then utilizing the velocity to search an archived time table, which is produced and organized according to the vehicle's velocity. For that reason, the controller sets the initial output rate of the airbag system based on the vehicle's velocity at impact rather than the occupant's weight. Thereafter, the controller can utilize the estimated time and the known volume of the airbag for calculating an output rate for the airbag system 14.

In step 106, the controller 18 determines whether a crash event has occurred. This step is accomplished by utilizing one or more crash sensors 26, which are coupled to the controller 18. These crash sensors 26 can be accelerometers or various other suitable crash sensors known in the art. If no crash has been detected, then the sequence returns to step 102.

However, if in step 106, the controller 18 determines that a crash event has occurred, then the sequence proceeds to step 108.

In step 108, the controller 18 utilizes the seatbelt-tension sensor 28 for measuring the seatbelt tension at time $t_n$. It will be appreciated that during the first cycle of operation, time $t_n$ is time $t_0$ or substantially proximate to when the crash event has been detected by the controller 18. The sequence then proceeds to step 110.

In step 110, the controller 18 utilizes the seatbelt-tension sensor 28 for measuring the seatbelt tension at time $t_{n+1}$, which is a predetermined amount of elapsed time after the first measurement was taken in step 108. Then, the sequence proceeds to step 112.

In step 112, the controller 18 utilizes the load measurements taken in steps 108 and 110 for determining a current seatbelt-tensioning rate. Specifically, the controller 18 subtracts the first load measurement from the second load measurement and divides the difference by the time elapsed between the tension measurements. However, it is contemplated that the OSR system 10 can utilize various other suitable methods and devices for determining the current seatbelt-tensioning rate. Then, the sequence proceeds to step 114.

In step 114, the controller 18 determines whether the current seatbelt-tensioning rate is greater than a maximum threshold. Specifically, the controller 18 can utilize the occupant's weight measurement and search an archived maximum-threshold table, which is stored within the controller's database, for the corresponding threshold value. It will be appreciated that the data in this table can be produced by tests conducted for a vehicle during a predetermined G-level crash while utilizing an airbag having a predetermined volume. This table is exemplified as follows.

| Occupant Weight (lbs) | Max Threshold (lbs/ms) |
| --- | --- |
| W < 100 | 6.66 |
| 100 < W < 150 | 10.00 |
| 150 < W < 220 | 13.33 |
| W > 220 | 18.00 |

In this way, the controller 18 can search the archived maximum-threshold table for determining the maximum threshold and comparing the current seatbelt-tensioning rate to the maximum threshold. If the controller 18 determines that the current seatbelt-tensioning rate is greater than the maximum threshold, then the sequence immediately proceeds to step 116.

In another embodiment, the controller utilizes the vehicle's current velocity to search an archived maximum-threshold table, which is organized according to the vehicle's velocity. For example, tests on an OSR system can produce the following archived maximum-threshold table.

| Vehicle Velocity (mph) | Max Threshold (lbs/ms) |
| --- | --- |
| 14 < V < 18 | 6.66 |
| 18 < V < 30 | 10.00 |
| V > 30 | 13.33 |

In step 116, the controller 18 increases the output rate of the inflator device 16 by a predetermined increment. Then, the sequence proceeds to step 188.

In step 118, the controller 18 actuates the airbag system 14 to inflate the airbag 20 at the current output rate setting. In the first instance of this cycle, the controller 18 actuates the airbag system 14 to begin inflating the airbag at the current output rate. However, in subsequent cycles, step 118 is accomplished by actuating the airbag system to continue inflating the airbag 20 at the current output rate setting.

However, if back in step 114 the controller 18 determined that the seatbelt-tensioning rate is less than the maximum threshold, than the sequence proceeds to step 120.

In step 120, the controller 18 determines whether the current seatbelt-tensioning rate is less than a minimum threshold. Specifically, similar to step 114, the controller 18 can utilize the occupant's weight measurement and search an archived minimum-threshold table, which is stored within the controller's database, for the corresponding threshold value. It is understood that the data in this table can be produced by tests conducted for a vehicle during a predetermined G-level crash while utilizing an airbag with a predetermined volume. This archived minimum-threshold table is exemplified as follows.

| Occupant Weight (lbs) | Min Threshold (lbs/ms) |
| --- | --- |
| W < 100 | 6.33 |
| 100 < W < 150 | 9.66 |
| 150 < W < 220 | 13.00 |
| W > 220 | 17.66 |

In this way, the controller 18 can search the archived rate table for determining the minimum threshold and comparing the current seatbelt-tensioning rate to the minimum threshold. If the controller 18 determines that the current seatbelt-tensioning rate is less than the minimum threshold, then the sequence immediately proceeds to step 122.

In another embodiment, the controller can utilize the vehicle's current velocity to search an archived minimum-threshold table, which is organized according to the vehicle's velocity. For example, tests on an OSR system can produce the following archived maximum-threshold table.

| Vehicle Velocity (mph) | Min Threshold (lbs/ms) |
| --- | --- |
| 14 < V < 18 | 6.33 |
| 18 < V < 30 | 9.66 |
| V > 30 | 13.00 |

In step 122, the controller 18 decreases the output rate of the inflator device 18 by a predetermined increment. Then, the sequence proceeds to step 118 described above.

However, if in step 120 the controller 18 determines that the current seatbelt-tensioning rate is greater than the minimum threshold, then the sequence proceeds immediately to step 118 described above.

After step 118, the sequence proceeds to step 124. In step 124, the controller 18 determines whether the airbag 20 has been fully deployed. This step can be accomplished by multiplying the output rate for the current cycle by the elapsed time for that cycle. By this function, the controller 18 can determine the volume of gas injected into the airbag during the current cycle. Thereafter, this volume of gas can be added to the volumes of gas injected into the airbag during prior cycles. The controller 18 can then compare the total amount of gas injected into the airbag to the known volume of the airbag. If the calculated amount of gas less than the known volume of the airbag, then the sequence returns to step 108 to begin another cycle of operation. However, if the calculated amount of gas is substantially equally to the known volume of the airbag 20, then the sequence terminates.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A safety restraint system for a vehicle, comprising:
a seatbelt restraint system including a seatbelt restraint for restraining an occupant and a seatbelt tension sensor for detecting a seatbelt load in said seatbelt restraint;
a variable-output airbag system for fully deploying an airbag substantially proximate in time to when said seatbelt restraint receives a maximum seatbelt load; and
a controller coupled to said seatbelt restraint system and said variable-output airbag system, said controller for actuating said variable-output airbag system to deploy said airbag at an output rate during a crash event, said controller for throttling said output rate based on a current seatbelt load rate in said seatbelt restraint during a crash event, wherein said controller determines said output rate based on the weight of said occupant, wherein said controller determines at least one of a maximum threshold and a minimum threshold for said seatbelt load rate based on the weight of said occupant, with said safety restraint system further comprising at least one crash sensor for detecting a crash event and sending a crash signal to said controller;
wherein said crash signal actuates said controller to utilize said seatbelt tension sensor for detecting a first seatbelt load and then a second seatbelt load after a time interval from detecting said first seatbelt load, said controller subtracting said first seatbelt load from said second seatbelt load and then dividing the difference by said time interval for determining said current seatbelt load rate.

2. The safety restraint system recited in claim 1 further comprising:
at least one weight sensor for measuring the weight of said occupant;
wherein said controller determines said output rate for said airbag based on said weight.

3. The safety restraint system as recited in claim 1 wherein said controller actuates said variable-output airbag system to deploy said airbag at said output rate when said current seatbelt load rate is less than said maximum threshold and greater than said minimum threshold.

4. The safety restraint system as recited in claim 1 wherein said controller increases said output rate of said variable-output airbag system when said current seatbelt load rate is greater than said maximum threshold.

5. The safety restraint system as recited in claim 1 wherein said controller decreases said output rate of said variable-output airbag system when said current seatbelt load rate is less than said minimum threshold.

6. A method for utilizing a seatbelt restraint system and a variable-output airbag system in combination for protecting an occupant of a vehicle, comprising:
determining an output rate of the variable-output airbag system for deploying an airbag;
detecting a crash event; and
determining a current seatbelt-tension rate in a seatbelt restraint during said crash event by detecting a first seatbelt load;
detecting a second seatbelt load after a time interval from detecting said first seatbelt load;
subtracting said first seatbelt load from said second seatbelt load; and
dividing the difference by said time interval for determining said current seatbelt-tension rate; and
throttling said output rate during said crash event based on said current seatbelt-tension rate;
wherein the occupant contacts said airbag when a seatbelt load reaches a maximum load.

7. The method as recited in claim 6 wherein determining an output rate of the variable-output airbag system comprises:
measuring the weight of the occupant; and
determining said output rate based on said weight.

8. The method as recited in claim 6 wherein throttling said output rate during said crash event based on said current seatbelt-tension rate comprises:
comparing said current seatbelt-tension rate to at least one of a maximum threshold and a minimum threshold.

9. The method as recited in claim 8 further comprising throttling selected from group consisting of:
increasing said output rate when said current seatbelt-tension rate is greater than said maximum threshold;
decreasing said output rate when said current seatbelt-tension rate is less than said maximum threshold; and
decreasing said output rate when said current seatbelt-tension rate is less than said minimum threshold.

10. The method as recited in claim 6 further comprising:
determining whether said airbag has been fully deployed.

* * * * *